July 7, 1970 K. D. SCHREYER 3,519,321
CABINET DOOR ASSEMBLY
Original Filed March 29, 1966 7 Sheets-Sheet 1

INVENTOR
KENNETH D. SCHREYER
BY
ATTYS

July 7, 1970 K. D. SCHREYER 3,519,321
CABINET DOOR ASSEMBLY

Original Filed March 29, 1966 7 Sheets-Sheet 2

July 7, 1970  K. D. SCHREYER  3,519,321

CABINET DOOR ASSEMBLY

Original Filed March 29, 1966  7 Sheets-Sheet 4

July 7, 1970     K. D. SCHREYER     3,519,321

CABINET DOOR ASSEMBLY

Original Filed March 29, 1966     7 Sheets-Sheet 6

United States Patent Office 3,519,321
Patented July 7, 1970

3,519,321
CABINET DOOR ASSEMBLY
Kenneth D. Schreyer, Doylestown, Pa., assignor to Lyon Metal Products, Incorporated, Aurora, Ill., a corporation of Illinois
Original application Mar. 29, 1966, Ser. No. 538,423, now Patent No. 3,410,621, dated Nov. 12, 1968. Divided and this application Jan. 10, 1968, Ser. No. 713,556
Int. Cl. A47b 88/00
U.S. Cl. 312—295                    15 Claims

ABSTRACT OF THE DISCLOSURE

The present invention is directed to a cabinet door assembly for closing the front opening in a cabinet, the assembly comprising inner, outer and center track structure extending the width of the opening, first, second and third doors slidably mounted on the associated tracks, each door comprising a front panel with side flanges and a reinforcement sheet between the side flanges and having a plurality of attachment portions secured to the rear side of the panel and reinforcement ribs between adjacent attachment portions, a pair of abutment surfaces adjacent both ends of the second door and a pair of abutment surfaces adjacent both ends of the third door, a first pick-up arm adjacent one end of the first door and extending between the abutment surfaces of the second door, and a second pick-up arm adjacent one end of the second door and extending between the abutment surfaces of the third door.

---

This application is a division of the co-pending application, Ser. No. 538,423, filed Mar. 29, 1966, for Storage Construction, now U.S. Pat. No. 3,410,621.

The present invention relates to storage constructions and particularly to an improved cabinet door assembly therefor.

It is an important object of the present invention to provide a cabinet having an improved door thereon including an outer panel and a reinforcing sheet disposed adjacent to the rear side of the outer panel, the reinforcing sheet being corrugated and bonded to the outer panel both by an adhesive and welds extending through the adhesive to provide a rigid construction with good sound deadening properties.

Yet another object of the present invention is to provide an improved door for use in closing the front opening in a cabinet, the door being lightweight yet rigid and being provided with suitable pulls and pick-up arms and abutment surfaces for co-operation with the associated cabinet and the associated doors.

Still another object of the invention is to provide a sliding door assembly for closing the front opening in a cabinet, the assembly comprising track structure supporting at least three sliding doors provided with pick-up arms and abutment surfaces thereon such that one motion fully opens or closes all of the doors; for example, the user grasping the righthandmost door can move that door and all other doors to the fully opened or fully closed position with a single motion, and conversely the user upon grasping the lefthandmost door can move that door and all the other doors to the fully opened or fully closed position with a single motion.

Further features of the invention pertain to the particular arrangement in a storage assembly of the cabinet doors therefor and the various parts thereof whereby the above-outlined and additional operating features thereof are attained.

The invention, both as to its organization and method of operation, together with further objects and advantages thereof, will best be understood by reference to the following specification taken in connection with the accompanying drawings, in which:

Referring now to the drawings, and particularly to FIGS. 1 to 4 thereof, there is illustrated a storage assembly or backbar 100 made in accordance with and embodying the principles of the present invention. The storage assembly 100 includes a top 101 and a base 150 between which are disposed three storage units, more specifically, a cabinet or bookcase 200 provided with sliding doors, a pedestal 400 with four drawers therein, and a cabinet 600 provided with a swinging door. Each of the storage units 200, 400 and 600 is firmly secured to the top 101 and is also firmly secured to the base 150, thereby to provide an integrated unitary storage assembly 100. There further are provided finishing end panels 500 on either end of the storage assembly to improve the appearance thereof.

The details of the construction of the top 101 will now be described with particular reference to FIG. 5 of the drawings. The top 101 includes a generally flat top plate 102 that is formed of sheet metal and is generally rectangular in shape, the corners thereof being rounded, the periphery of the top plate 102 being essentially the same as the periphery of the top 101. Disposed beneath the top plate 102 and extending around the periphery thereof is an edging 103 also formed of sheet metal, a substantially flat piece of sheet metal having been deformed to provide an attachment flange 104, a side flange 105, a mounting flange 106, a bottom flange 107 and an upturned flange 108 (see FIGS. 9 and 10).

Also disposed on the underside of the top plate 102 is a reinforcing sheet 110 formed from a substantially flat piece of sheet metal bent to provide a plurality of spaced apart ribs 112 joined together by attachment portions, the attachment portions being connected to the top plate 102 by use of a body of mastic disposed therebetween and by use of welds.

Also mounted beneath the top 102 are two longitudinally extending and substantially parallel and spaced apart mounting channels 120, each mounting channel 120 including longitudinally extending main wall 121 (see FIGS. 9 and 10) and a pair of depending side flanges 122 carrying on the lower ends thereof respectively inturned holding flanges 123. As will be explained in detail hereinafter, all of the storage units 200, 400 and 600 are mounted upon the top 101 by means of the mounting channels 120.

Disposed on the upper surface of the top plate 102 is a covering 125, preferably formed of a synthetic organic resin, the preferred materials being those sold under the trademarks "Textolite," "Micarta" and "Formica." An adhesive is applied both to the upper surface of the top plate 102 and to the lower surface of the covering 125 to provide a good bond therebetween.

To complete the top 101, a decorative trim 130 (see FIGS. 9 and 10) is provided therearound, the trim 130 comprising a length of extruded aluminum metal including a decorative body 131 extending from adjacent to the upper surface of the covering 125 and downwardly below the upper edge of the edging 103. Integral with the body 131 is a mounting tongue 135, the tongue 135 being concavely curved as viewed from the top and being resiliently gripped between the lower surface of the top plate 102 and the upper surface of the mounting flange 106.

Figure 1:
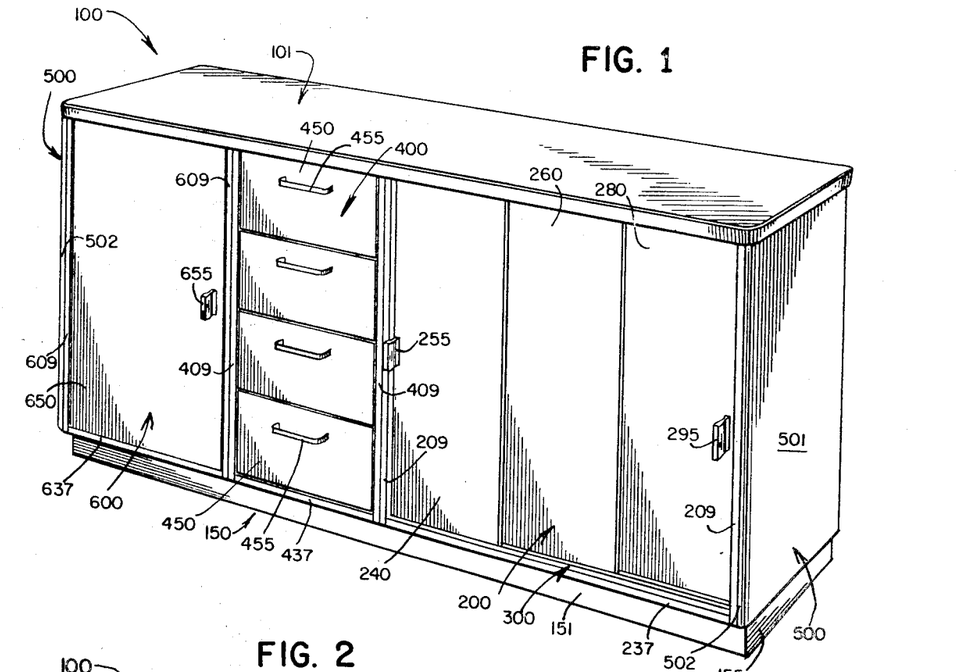
FIG. 1 is a front perspective view of a storage assembly made in accordance with and embodying the principles of the present invention.
Figure 2:
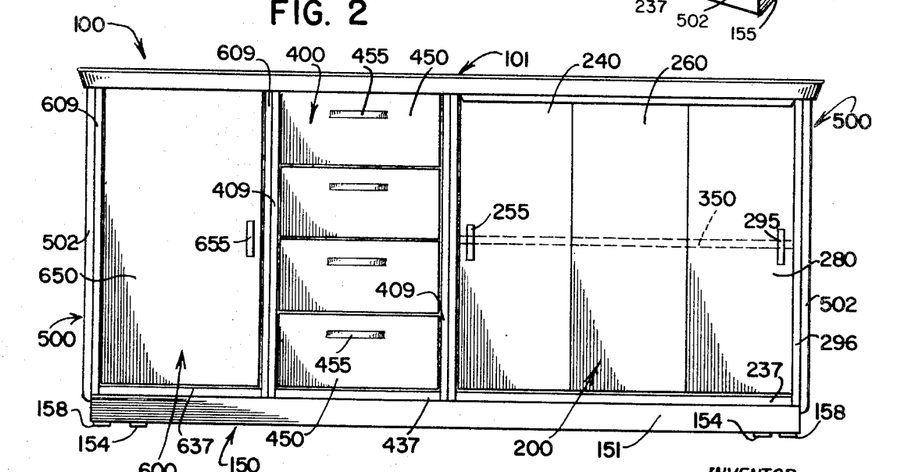
FIG. 2 is a front elevational view of the storage assembly of FIG. 1.
Figure 3:
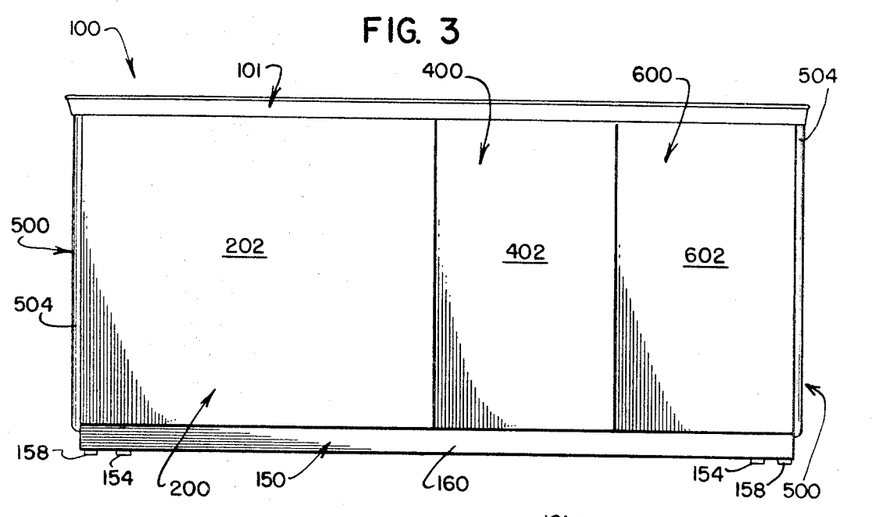
FIG. 3 is a rear elevational view of the storage assembly of FIGS. 1 and 2.
Figure 4:
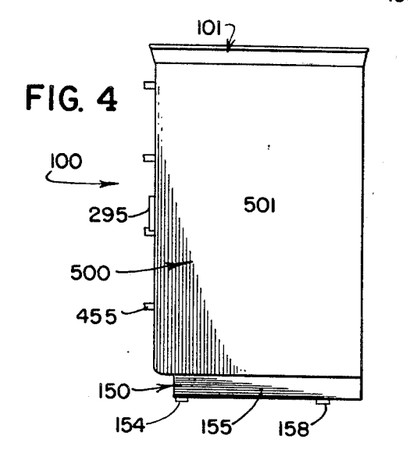
FIG. 4 is an end elevational view of the storage assembly of FIGS. 1 to 3.
Figure 5:
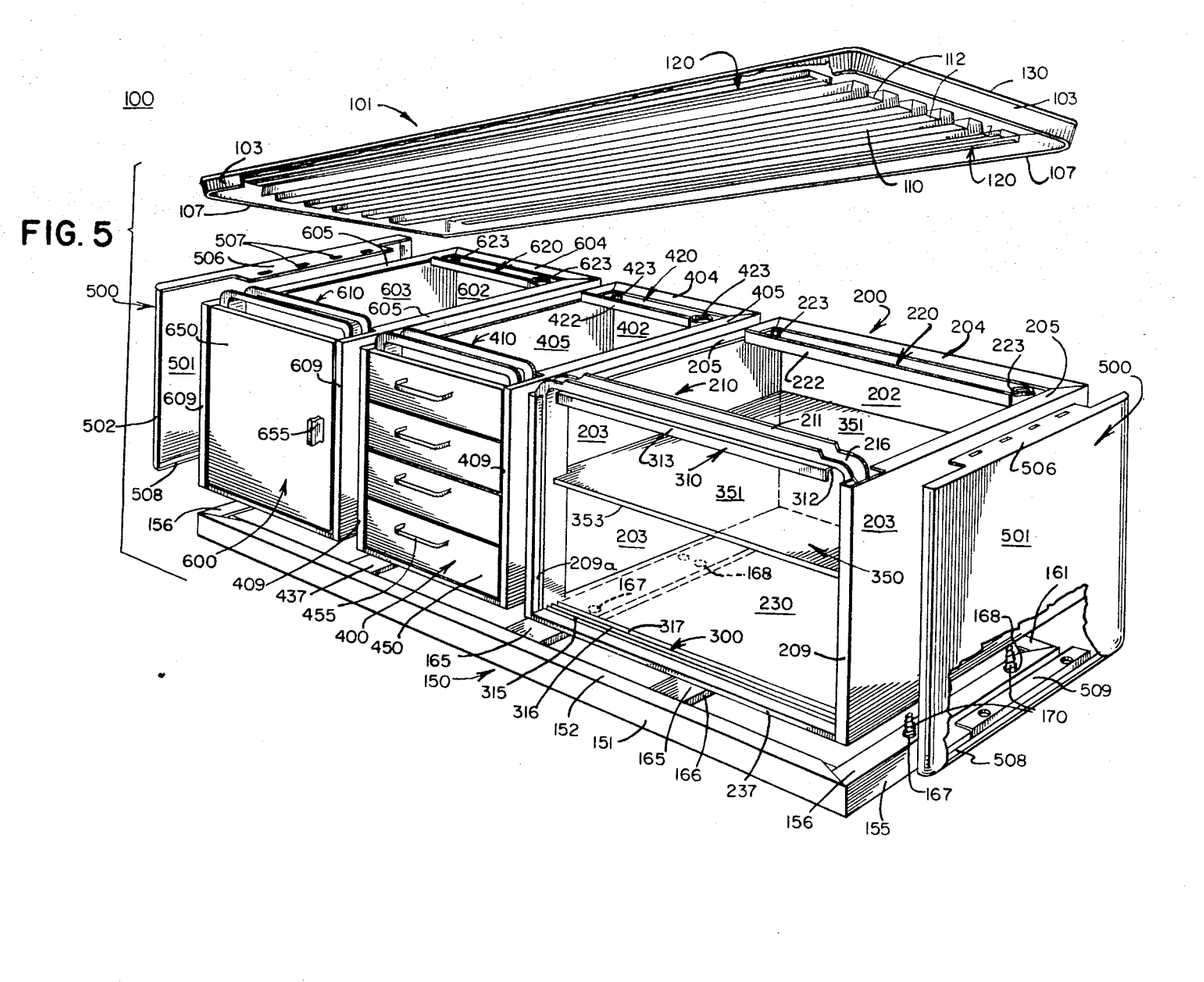
FIG. 5 is an exploded view of the storage assembly of FIGS. 1 to 4 with the three sliding doors removed from the cabinet disposed to the right.
Figure 6:
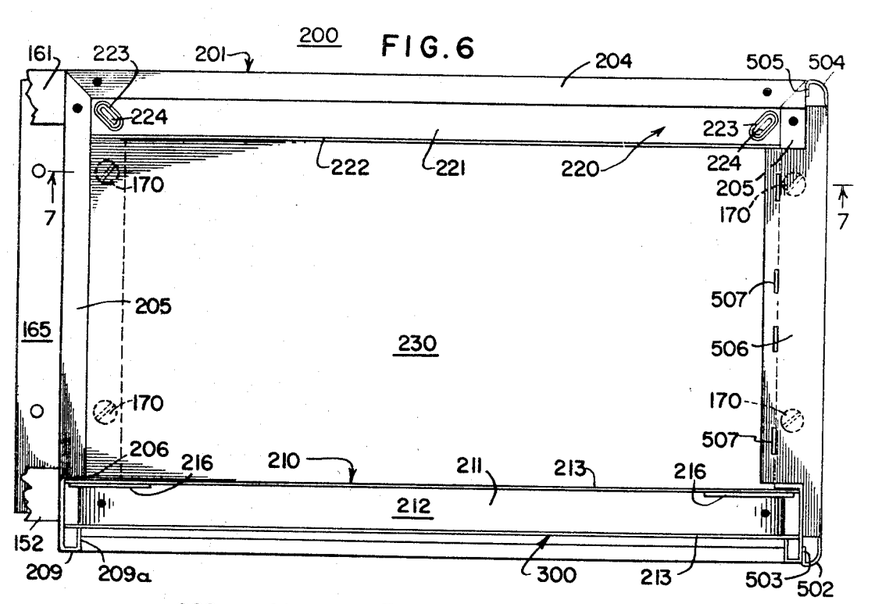
FIG. 6 is a plan view of the righthand storage unit mounted upon the base with the top removed.
Figure 7:
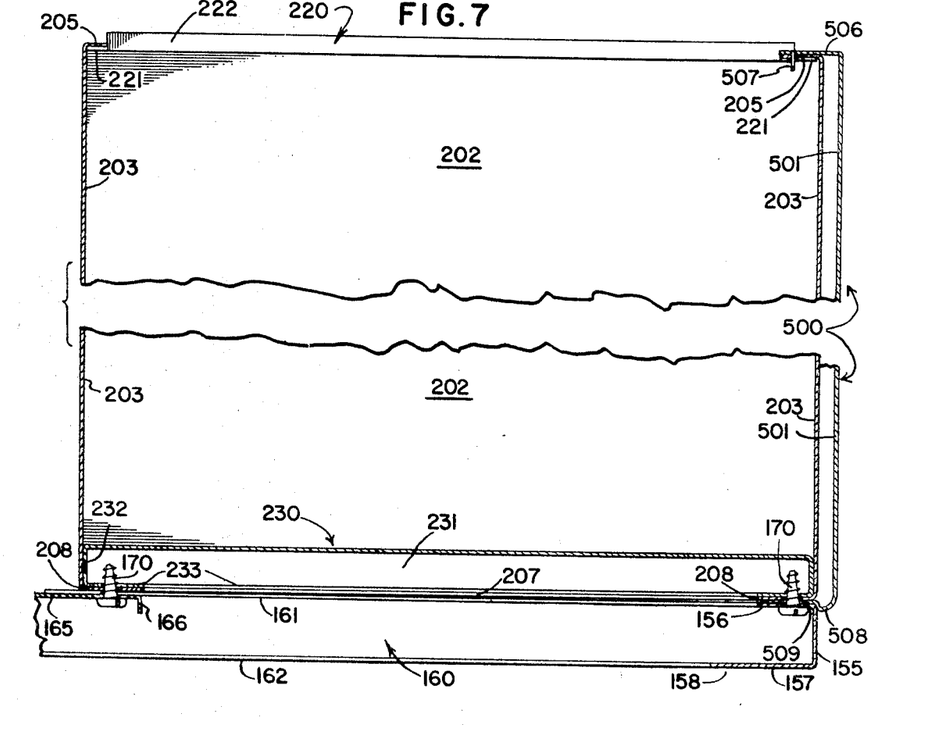
FIG. 7 is a view in vertical section with certain parts broken away along the line 7—7 of FIG. 6.
Figure 8:
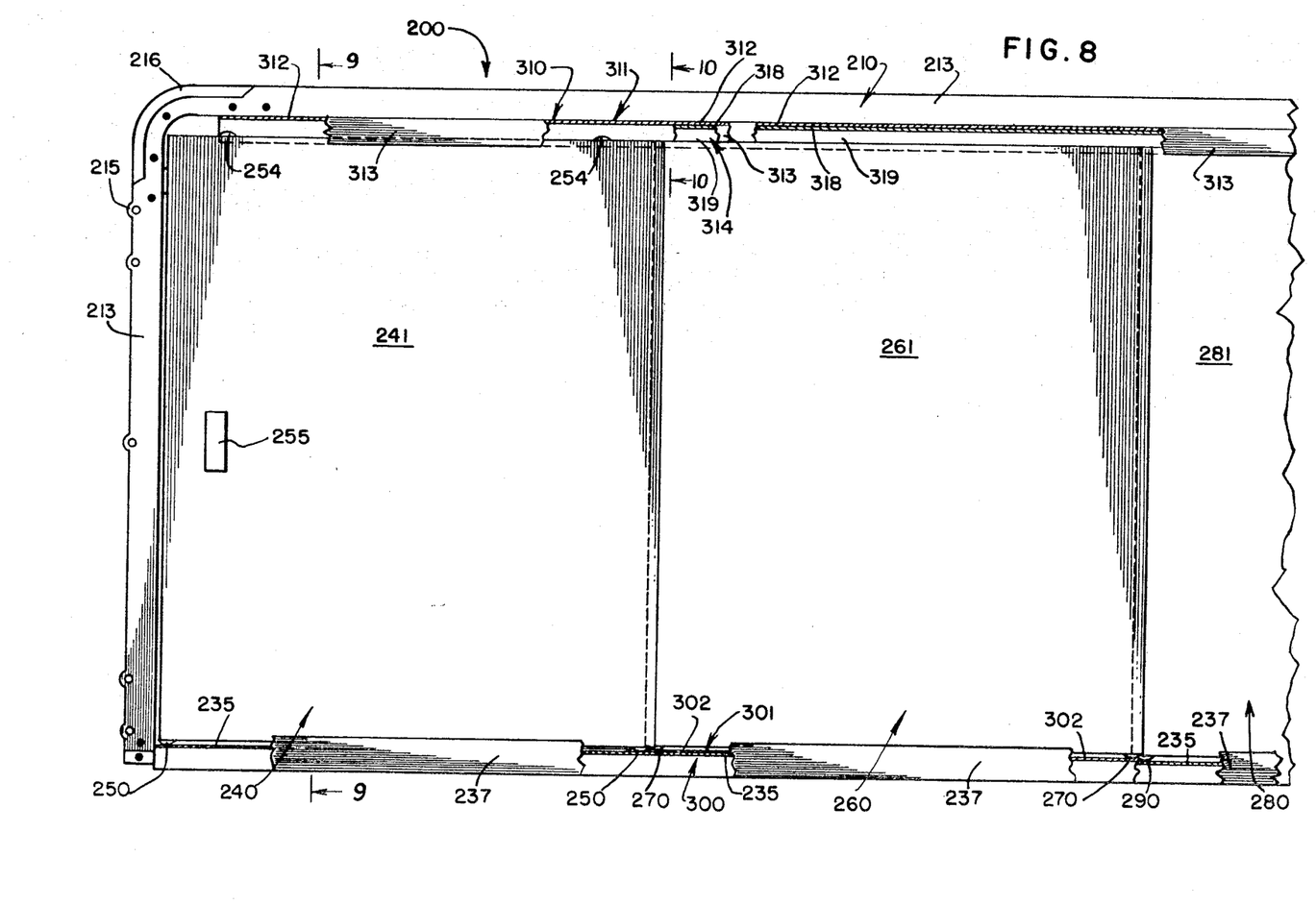
FIG. 8 is an enlarged view with certain portions broken away of the front of the righthand storage unit; the body having been removed therefrom to illustrate the welding projections.

Referring now to FIGS. 5 and 7 of the drawings, the details of construction of the base 150 will be described. As illustrated, the base 150 is essentially rectangular in shape and is formed from a front frame member 151 and a rear frame member 160 that are suitably interconnected as by welding. The front frame member 151 is more particularly U-shaped and has a pair of integral side frame members 155 at either end thereof disposed substantially normal thereto and extending rearwardly therefrom. The front frame member 151 further has an integral upper flange 152 and an integral lower flange (not shown) extending rearwardly therefrom therefrom and substantially parallel to each other. The side frame members 155 likewise have upper flanges 156 on the upper edges thereof and lower flanges 157 on the lower edges thereof extending normal to the associated side frame member 155 and substantially parallel to each other. Each of the lower flanges 157 has thereon adjacent to the rear end thereof a downwardly extending embossment providing a foot 158.

The rear frame member 160 likewise has an upper flange 161 and a lower flange 162 thereon disposed parallel to each other and extending forward and overlapping the flanges 156 and 157 on the side frame members 155. In order further to rigidify the base 150, a plurality of braces 165 has been provided, three of the braces 165 having been illustrated and disposed substantially equidistantly along the length of the base 150 and extending between the front frame member 151 and the rear frame member 160. Each of the braces 165 has a pair of side flanges 166 thereon extending downwardly therefrom and has the outer ends thereof disposed beneath the associated flange 152 or 161, as the case may be, and secured thereto as by welding at 169. Finally, a forward row of openings 167 is provided across the base 150, one of the openings 167 being provided in the lefthand flange 163, a pair of the openings 167 being provided in each of the braces 165 and an opening 167 being provided in the righthand flange 156. A similar row of rear openings 168 is provided across the base 150, one of the openings 168 being provided in the lefthand flange 156, a pair of the openings 168 being provided in each of the braces 165 and one of the openings 168 being provided in the righthand flange 156.

The details of construction of the righthand storage unit 200 will now be described with special reference to FIGS. 5 to 13 of the drawings. The storage unit 200 is in the form of a cabinet or bookcase and comprises a body 201 including a substantially rectangular rear wall 202, and a pair of substantially rectangular side walls 203 extending forwardly therefrom and disposed substantially perpendicular thereto and parallel to each other. The upper edge of the rear wall 202 carries a top rear flange 204 and the upper edges of the side walls 203 carry top side flanges 205, the forward edges of the top side flanges 205 being cut out as at 206 for a purpose which will be more fully explained hereinafter. The lower edge of the rear wall 202 carries a bottom rear flange 207 and the lower edges of the side walls 203 carry bottom side flanges 208. The forward edges of the side walls 203 carry inwardly directed front flanges 209 that extend substantially vertically and terminate in rearwardly directed flanges 209a.

Disposed at the forward portion of the cabinet body 201 is a front frame 210, the details of construction of which are best illustrated in FIGS. 5 to 13 of the drawings, and from those views it will be seen that the frame 210 is formed of a substantially U-shaped channel 211 having the legs thereof disposed vertically with the upper ends of the legs integrally joined to form the U-shape thereof, the channel 211 including a main wall 212 having a pair of side flanges 213 on the edges thereof. The three lower ends of the U-shaped channel 211 are joined by a bottom channel 214, see FIG. 9 also, the channel 214 including a main wall 217 having an offset portion 218 and a pair of side flanges 219. As may be best seen in FIG. 8, the channel side flanges 213 are provided with outwardly extending welding projections 215 thereon for welding attachment to the side walls 203 (not shown in FIG. 8) and the front frame 210 is further strengthened by means of gusset plates 216 at each of the upper corners thereof. In assembling the side walls 203 to the channel 211, a layer of mastic (not shown) is applied to the inner surfaces of the side walls 203 opposite the projections 215, after which the projections 215 are pressed into the mastic and into contact with the side walls 203, and thereafter the side walls 203 are welded to the projections 215, the heat from the welding together with the heating to set the paint later applied curing he mastic. The resultant bond between the front frame 210 and the side walls 203 is usually strong and in addition serves to deaden sound transmission therebetween. Further details of this construction are disclosed in the copending application of Kenneth D. Schreyer, Ser. No. 503,157, filed Oct. 23, 1965 for Desk Construction, now Pat. No. 3,363,955. It will be seen therefore that the front frame 210 extends upwardly through the cut out portions of the side top flanges 205 with the flanges 209a disposed adjacent to the forward surfaces thereof and with the side walls 203 firmly secured thereto both by welding and by the mastic disposed therebetween.

A rear top support 220 is disposed adjacent to the rear end of the cabinet 200 and includes a body 221 having portions extending under the top rear flange 204 and the top side flanges 205 and suitably secured thereto as by welding. The forward edge of the top support 220 disposed between the inner edges of the top flanges 205 is provided with an upstanding front flange 222 disposed substantially normal to the body 221. Disposed in the ends of the body 221 and in the corners of the cabinet 200 are upwardly extending embossments 223 having centrally therein elongated openings 224 oriented diagonally with respect to the rear corners of the cabinet 200, the openings 224 being adapted to receive fasteners for the mounting of the cabinet 200 on the top 101 as will be explained more fully hereinafter.

A bottom wall 230 is also provided in the cabinet 202, the bottom wall 230 having a depending rear flange 231 and depending side flanges 232 integral therewith and both carrying on the lower edges thereof inwardly directed bottom flanges 233 that rest upon the bottom side flanges 208 of the body 201 and are suitably secured thereto as by welding. The forward portion of the bottom wall 230 carries a downturned flange 234 integral with which is a door support flange 235 carrying on the forward edge thereof an upturned flange 236. Finally, there is provided on the forward edge of the bottom wall 230 a front flange 237 extending downwardly and terminating in a rearwardly directed bottom flange 238. As will best be seen in FIG. 16, the bottom wall 230 rests upon the bottom channel main wall 217 whereas the depressed flange 235 rests upon the offset 218 in the main wall 217, the offset flange 235 forming a part of the door track structure as will be described more fully hereinafter.

Figures 9, 10, 11:
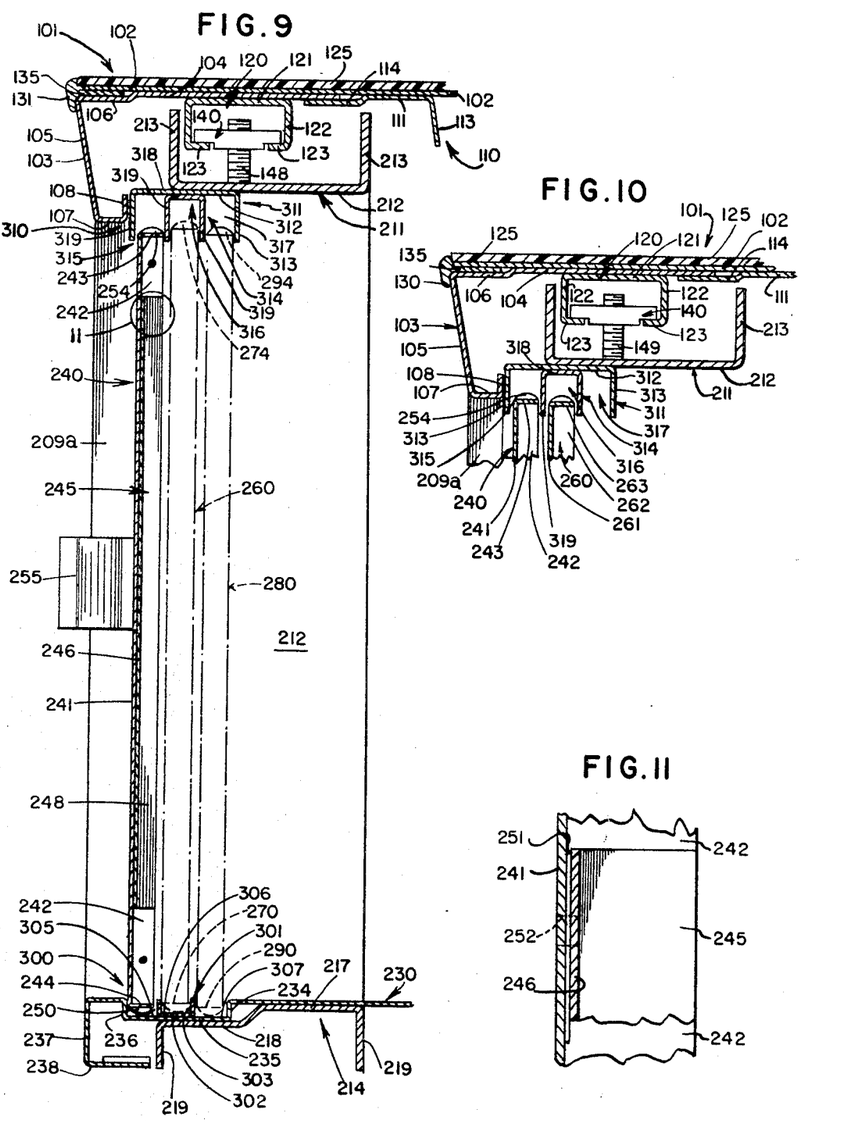
FIG. 9 is a view in vertical section along the line 9—9 of FIG. 8 and with the top in position thereon.
FIG. 10 is a fragmentary view in vertical section along the line 10—10 of FIG. 8 with the top in position thereon.
FIG. 11 is an enlarged view of the portion of FIG. 9 within the circle designated 11.
Figure 12:
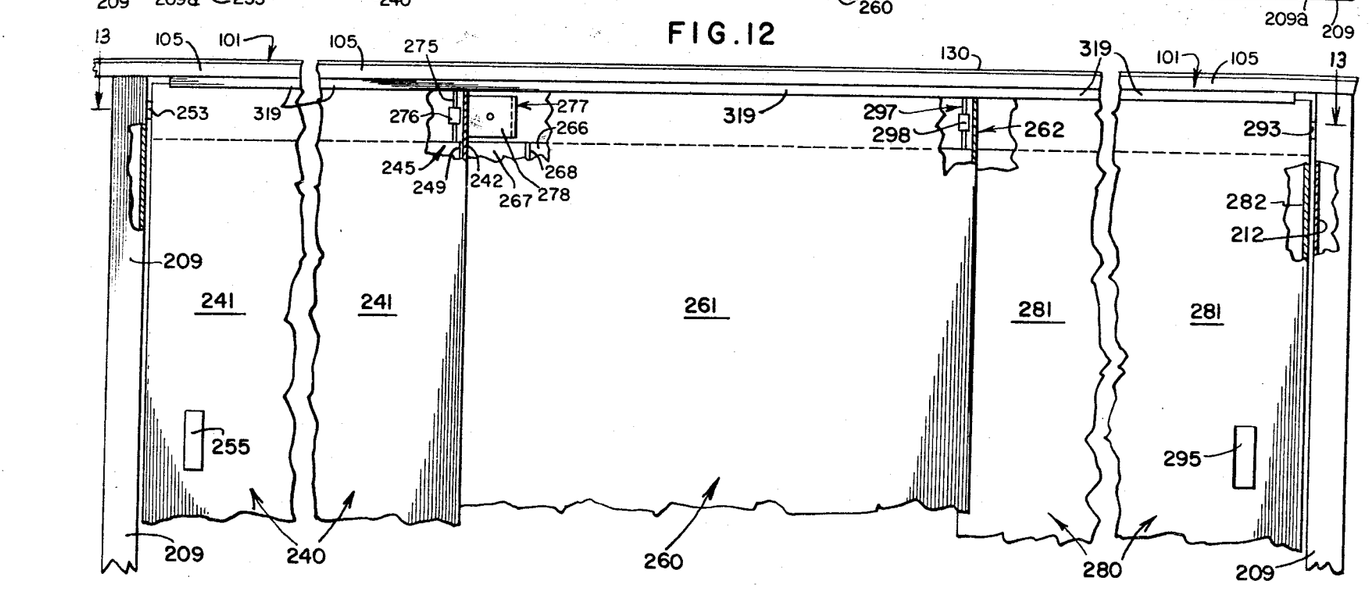
FIG. 12 is a view similar to FIG. 8 but illustrating additional features of the storage unit and particularly the interconnection between the three sliding doors thereof.
Figure 13:
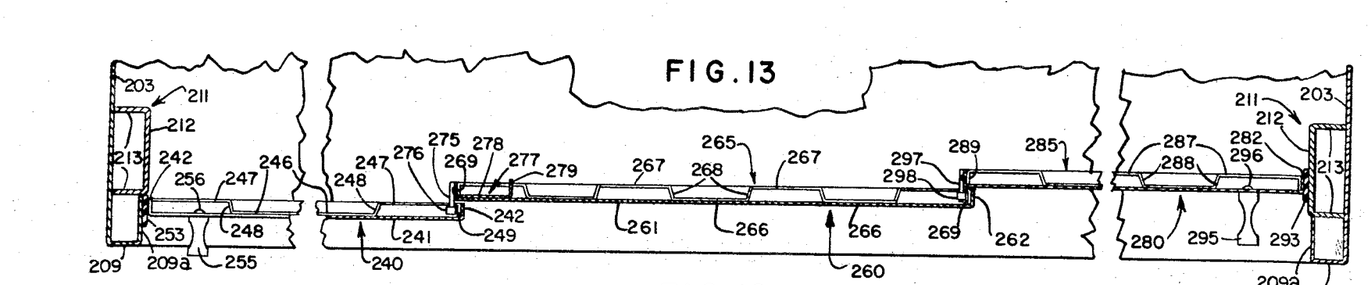
FIG. 13 is a fragmentary view in horizontal section along the line 13—13 of FIG. 12.

The front opening of the cabinet 200 defined by the front frame 210 is provided with a door structure so that this front opening can be closed when desired and selectively opened when required. To this end three sliding doors 240, 260 and 280 have been provided in the front opening and mounted upon lower track structure 300 and upper track structure 310. The details of construction of the doors and the tracks therefor will now be described with special reference to FIGS. 8 to 13 of the drawings. The lefthand door 240 comprises a front panel 241 that is generally rectangular in shape and has a height to fill the space between the track structures 300 and 310 and a width to close approximately one-third of the opening in the front of the cabinet 200. There is provided on each end of the front panel 241 a side flange 242 and one the upper edge thereof a top flange 243 and on the lower edge thereof a bottom flange 244, the four flanges named preferably being joined as by welding at the corners to provide a strong structure. Disposed behind and mounted upon the rear surface of the front panel 241 is a reinforcing sheet 245 that is corrugated in structure including a plurality of longitudinally spaced apart attachment portions 246 between which are disposed reinforcing ribs 247 having rearwardly converging side walls 248. The ends of the reinforcing sheet 245 are provided with end flanges 249 disposed within and abutting against the inner surfaces of the side flanges 242 and secured thereto as by welding. As is best illustrated in FIG. 11, a body of mastic 251 is disposed between each of the attachment portions 246 and the rear of the front panel 241 and welds 252 are made therethrough to provide an unusually strong construction having good sound deadening properties. It further will be noted that the vertical extent of the reinforcing sheet 245 is substantially less than the vertical extent of the front panel 241, the reinforcing sheet 245 being arranged substantially centrally in a vertical direction between the top flanges 243 and the bottom flange 244 on the front panel 241.

In order to support the door 240 upon the associated track structure for sliding movement therealong, a pair of lubric glides has been provided on the bottom flange 244, the lower glides being designated by the numeral 250 and being preferably formed of a synthetic organic resin, such as a nylon resin. The lefthand side flange 242 is also provided with a pair of vertically spaced apart resilient bumpers 253 extending therefrom and in position to engage the adjacent flange 209a to cushion movement of the door 240 to the fully closed position thereof. There also is provided on the top flange 243 a pair of longitudinally spaced apart upper glides 254, also formed of a lubric material such as nylon resin, and adapted to engage braking surfaces as will be described more fully hereinafter. Mounted on the forward surface of the front panel 241 is a pull 255 extending essentially vertically, disposed substantially midway of the vertical extent of the door 240 and secured thereto by screws 256 extending through aligned openings in the front panel 241 and into the rear of the pull 255.

The central door 260 is formed generally like the door 240 and includes a front panel 261 having rearwardly directed side flanges 262 on the side edges thereof, a rearwardly directed top flange 263 on the upper edge thereof and a rearwardly directed bottom flange on the bottom edge thereof, the several flanges named being preferably joined as by welding to provide a strong unitary structure. A corrugated reinforcing sheet 265 is provided on the rear surface of the front panel 261 disposed substantially centrally thereof and extending between the side flanges 262. The reinforcing sheet 265 includes a plurality of longitudinally spaced apart attachment portions 266 that are oriented generally vertically and are joined by ribs 267 having rearwardly converging side walls 268. Provided on the ends of the reinforcing sheet 265 are end flanges 269 that are disposed within the side flanges 262 and are secured thereto as by welding. Disposed between the attachment portions 266 and the rear surface of the front panel 261 are bodies of mastic (not shown) through which welds are made to provide a strong structure having good sound deadening properties.

In order to mount the door 260 on the associated track structure for free sliding movement with respect thereto, a pair of longitudinally spaced apart lower glides 270 has been provided on the bottom flange 264 and a pair of longitudinally spaced apart upper glides 274 has been provided on the top flange 263, the glides 270 and 274 being formed of a lubric material such as a synthetic organic plastic resin, the preferred resin being a nylon resin. Mounted on the lefthand end of the door 260 is a pair of forwardly extending pick-up arms 275 secured as by welding to the associated side flange 262 and being disposed so as to extend into the rear of the door 240 respectively above and below the reinforcing sheet 245 thereof for engagement with the inner surface of the adjacent side flange 242 which provides cooperating abutment surfaces therefor. In order to cushion the engagement between the doors 240 and 260, the pick-up arms 275 are provided with resilient bumpers 276, formed for example of rubber. There also is provided on the rear of the front panel 261 a pair of pick-up brackets 277 disposed respectively above and below the reinforcing sheet 265 and each including an attachment flange 278 connected as by welding to the front panel 261 and an integral abutment flange 279 extending rearwardly beyond the rearmost portion of the door 260.

The righthand door 280 is also formed like the door 240 and includes a generally rectangular front panel 281 having a pair of rearwardly directed side flanges 282 on the side edges thereof, a rearwardly directed top flange 283 on the upper edge thereof and a rearwardly directed bottom flange 284 on the lower edge thereof, all of the flanges named being connected as by welding to provide a strong unitary structure. Mounted on the rear surface of the front panel 281 is a corrugated reinforcing sheet 285 extending between the side flanges 282 and generally centered vertically but having a vertical extent less than that of the front panel 281. The reinforcing sheet 285 includes a plurality of longitudinally spaced apart vertically extending attachment portions 286 joined by the ribs 287 having rearwardly converging side walls 288, the ends of the reinforcing sheet 285 being provided with end flanges 289 that fit within the side flanges 282 and are secured thereto as by welding. Disposed between the attachment portions 286 and the rear surface of the front panel 281 are bodies of mastic (not shown) through which welds are made to secure the reinforcing sheet 285 to the front panel 281, thus to provide a strong lightweight structure having good sound deadening properties.

In order to mount the door 280 upon the associated track structure, a pair of longitudinally spaced apart lower glides 290 has been provided on the bottom flange 284 and a pair of longitudinally spaced apart upper glides 294 has been provided upon the upper flange 283, the glides 290 and 294 being formed of a lubric material such as a synthetic organic plastic resin, the preferred material being a nylon resin. The righthand side flanges 282 is provided with a pair of vertically spaced apart resilient bumpers 293 thereon, formed for example of rubber, and adapted to abut against the adjacent channel main wall 212 to cushion the movement of the door 280 to the closed position thereof. There further is provided on the front surface of the front panel 281 a pull 295 secured thereto by a pair of screws 296 extending through aligned openings in the front panel 281 and into openings in the rear of the pull 295. The pull 295 is disposed to the right as viewed from the front and adjacent to the side flange 282 that carries the bumpers 293. Attached to the lefthand side flange 282 and extending forwardly therefrom is a pair of pick-up arms 297 disposed adjacent to the upper and lower edges, respectively, of the door 280. The portions of the pick-up arms 297 disposed forwardly of the door 280 carry bumpers 298 that are disposed in the rear of the door 260 to engage abutment surfaces provided by the righthand side flange 262 and the abutment flanges 279. In this regard it is pointed out that the pick-up arms 297 are disposed respectively above and below the reinforcing sheet 265 on the door 260.

The doors 240, 260 and 280 are mounted for sliding movement in a lower track structure 300 and an upper track structure 310. As may be best seen in FIG. 9, the lower track structure 300 is provided by the door support flange 235 in the bottom wall 230 and the flanges 234 and 236 on either side thereof, there further being provided a channel 301 centrally of the support flange 235 and extending the length thereof. The channel 301 includes a main wall 302 suitably secured as by welding to the flange 235 and having extending upwardly from the longitudinally extending edges thereof side flanges 303. The flanges 238 and the adjacent side flange 303 cooperate to provide a front track 305, the side flanges 303 cooperate to provide a middle track 306 and the flange 234 and the adjacent side flange 303 combine to provide a rear track 307. The upper track structure 310 is disposed vertically above the lower track structure 300 and includes an outer channel 311 extending along the top of and within the front frame 210 and terminating at a point spaced from the inner sides of the channel 211, all as may be best seen in FIG. 9. The outer channel 311 comprises a main wall 312 that extends the length of the upper track structure 311 and is suitably secured as by welding to the front frame 210 and specifically to the main wall 212 thereof. Integral with the longitudinally extending edges of the main wall 312 are depending side flanges 313. Disposed centrally of the main wall 312 is an inner channel 314 including a main wall 318 extending the length of the main wall 312 and having on the longitudinally extending edges thereof a pair of depending side flanges 319. The forward one of the side flanges 313 and the forward one of the side flanges 319 cooperate to provide a front track 315; the side flanges 319 cooperate to provide a middle track 316 and the rear side flange 319 and the rear side flange 313 cooperate to provide a rear track 317.

It will be understood that the lefthand door 240 is disposed in the lower front track 305 and the upper front track 315 and is fundamentally supported upon the flange 235 by means of the lower lubric glides 250; the center door 260 is mounted in the lower middle track 306 and the upper middle track 316 is carried by the main wall 302 and supported thereon by the lower glides 270 thereon; and the righthand door 280 is supported in the lower rear track 307 and the upper rear track 317 and is supported upon the flange 235 by means of the lower glides 290 thereon. When the doors are so arranged, the pick-up arms 275 are disposed in the rear of the door 240 and are positioned respectively above and below the reinforcing sheet 245 thereof to engage either one of the side flanges 242 serving as abutment surfaces therefor. The pick-up arms 297 on the door 280 extend forwardly into the rear of the door 260 respectively above and below the reinforcing sheet 265 thereof in position to engage either the righthand side flange 262 serving as an abutment surface or the abutment flange 279 on the one of the pick-up brackets 277. Because of this arrangement, all of the doors may be moved to the right, for example, by grasping the pull 255 and moving it to the extreme righthand position, and conversely all of the doors can be again returned to a closed position by simply moving the pull 255 to the lefthandmost position thereof, all with a single continuous movement; likewise, all of the doors can be moved to the left by grasping the pull 295 and moving it as far as it will go to the left, and conversely all of the doors can be returned to the closed position thereof by simply moving the pull 295 to the righthandmost position thereof, all with a single continuous movement. More specifically, when the pull 255 is grasped and moved toward the right, the pick-up arms 275 are ultimately engaged by the lefthandmost side flange 242 after which the door 240 and the door 260 are moved as a unit until the pick-up arms 297 engages the abutment flange 279, this occurring just before the righthand side flange 262 would engage the pull 295; all of the doors are now in the righthand position and have been placed therein by a single movement of the pull 255 to the right; it will be understood that the provision of the bumpers 276 and 298 upon the pick-up arms 275 and 297, has cushioned the various contacts among the doors, and the lubric glides have made such movement of the doors quiet and smooth. All of the doors can again be moved to the closed position by simply moving the pull 255 toward the left. In so doing, the pick-up arms 275 are engaged by the righthand side flange 242 after a suitable movement of the door 240 to the left, after which the doors 240 and 260 are moved as a unit until the righthand flange 262 contacts the pick-up arms 297 and the bumpers 253 engage the side flange 209a. All of the doors in a like manner can be moved to the left by grasping the pull 295 and moving it to the left. In such action, the pick-up arms 297 after a suitable movement of the door 280 contact the abutment flange 279 and thereafer the doors 280 and 260 move as a unit until ultimately the pick-up arms 275 strike the lefthand side flange 242 on the door 240; all of the doors are now in the lefthand position and have been placed therein by a single movement of the pull 295 to the left; all of the doors can then be moved to the fully closed position by a single movement of the pull 295 to the right, the pick-up arms 297 engaging the righthand side flange 262 after a suitable movement of the door 280 after which the door 280 and the door 260 move together until the pick-up arms 275 strikes the righthand side flange 242 and the bumpers 293 engage the frame wall 212.

Disposed within the cabinet 200 and extending rearwardly therefrom and supported therein in cantilever fashion is a shelf 350, the mounting and construction of the shelf 350 being illustrated in FIG. 5 and including a rectangular main panel 351 formed of sheet metal.

Referring now to FIG. 5, the details of construction of the storage unit 400 will be described. As illustrated, the storage unit 400 is in the form of a pedestal having mounted therein a plurality of sliding drawers. The pedestal 400 comprises a substantially rectangular rear wall 402, and a pair of substantially rectangular side walls extending perpendicular thereto and parallel to each other. The upper edge of the rear wall 402 carries a top rear flange 404 and the upper edges of the side walls carry top side flanges 405.

Disposed at the forward portion of the pedestal 400 is a front frame 410, the frame 410 being formed from a channel member extending completely around the front opening in the pedestal 400.

A rear top support 420 is disposed adjacent to the rear end of the pedestal 400 and has upwardly extending embossments disposed in the ends of the support 420. An opening in each of the embossments 423 is adapted to receive fasteners for the mounting of the pedestal 400 on the top 101. Further details of construction of the pedestal 400 are set forth in the copending application of Kenneth D. Schreyer, Ser. No. 503,157, filed Oct. 23, 1965 for Desk Construction, now Pat. No. 3,363,955.

Disposed within the pedestal 400 are a plurality of drawers 450, four box drawers 450 having been illustrated in the drawings, each of the drawers 450 being provided with a suitable pull 455.

Referring now to FIG. 5, the details of construction of the storage unit 600 will be described. As illustrated, the storage unit 600 is in the form of a pedestal having mounted thereon a swinging door. The pedestal 600 comprises a body 601 including a substantially rectangular rear wall 602, and a pair of substantially rectangular side walls 603 extending perpendicular thereto and parallel to each other. The upper edge of the rear wall 602 carries a top rear flange 604 and the upper edges of the side walls 603 carry top side flanges 605. The forward edges of the side walls 603 also carry inwardly directed front flanges 609 that extend substantially vertically.

Disposed at the forward portion of the pedestal body 601 is a front frame 610, the frame 610 being formed from a channel member extending completely around the front opening in the pedestal body 601, the channel member being U-shaped in cross section. The frame 610 fits within the forward portion of the pedestal 600. A rear top support 620 is disposed adjacent to the rear end of the pedestal 600 and includes a pair of upwardly-extending embossments 623, each having an opening therein adapted to receive a fastener for the mounting of the pedestal 600. There is further provided a door 650 hingedly mounted to the front frame 610, a pull 655 being provided to facilitate in opening and closing of the door 650. Further details of construction of the pedestal 600 are set forth in the copending application of Kenneth D. Schreyer, Ser. No. 503,157, filed Oct. 23, 1965 for Desk Construction, now Pat. No. 3,363,955.

There is provided at either end of the storage assembly 100 a finishing panel 500, details of construction of which are best seen in FIG. 5 of the drawings. The finishing panels 500 are formed identical to one another, and accordingly, only one will be described in detail, like reference numerals being applied to like parts of both the finishing panels 500. As illustrated, the finishing panel 500 includes a main wall 501 that is generally rectangular in shape and has a width and height such as to cover the end of the adjacent storage assembly 100. The forward edge of the main wall 501 carries an integral curved side flange 502 thereon that extends inwardly. The upper edge of the main wall 501 carries an inwardly directed top flange 506 which overlies the adjacent storage unit side top flange such as the side top flange 205 in FIG. 5. The lower end of the main wall 501 carries an inwardly directed rounded bottom flange 508 which extends upwardly and terminates in a lateral flange 509 that is disposed on top of the base upper flange 156, the longitudinal extent of the lateral flange 509 being substantially less than the longitudinal extent of the main wall 501 as may be best seen in FIG. 5 of the drawings. In fitting over the base flange 156, the lateral flange 509 also is disposed beneath the side bottom flange of the adjacent storage unit such as the side bottom flange 208 on the cabinet side wall 203 as illustrated in FIG. 5.

It will be seen that each of the storage units 200, 400 and 600 as well as the finishing panels 500 are connected both to the top 101 and the base 150. More specifically, the front mounting channel 120 on the top 101 is received between the side flanges at the top of the front frames 210, 410 and 610 of the storage units 200, 400 and 600, respectively, each of the front frames having openings therethrough which receive the bolts 149 (see FIGS. 9 and 10) engaging the special nuts 140 disposed in the mounting channel 120, whereby each of the storage units 200, 400 and 600 has the forward end thereof firmly clamped to the front mounting channel 120. Furthermore, the rear mounting channel 120 is disposed above the rear top supports 220, 420 and 620 of the storage units 200, 400 and 600, respectively, and in position such that the bolts 149 extending through the diagonal openings therein are engaged by special nuts 140 disposed in the rear mounting channel 120. As a consequence, the rear end of each of the storage units 200, 400 and 600 can be firmly clamped to the top 101 via the rear mounting channel 120 thereon. Such clamping of the storage units 200 and 600 to the underside of the top 101 likewise clamps the top flanges 506 on the finishing panels 500 in the operative positions thereof. The bottoms of the storage units 200, 400 and 600 are likewise fixably connected to the base 150.

It will be understood that a wide variety of storage units may be utilized in the storage assembly 100, and further that the storage units illustrated can be modified and the order thereof on the base 150 changed and rearranged. For example, the order of the storage units on the base 150 can be rearranged so that any one of the three storage units illustrated may be placed in any of the three possible positions thereof upon the base 150 and beneath the top 101. The storage unit 200 further may be modified to omit the shelf 350, if desired, and likewise the doors 240, 260 and 280 may be omitted therefrom. In the storage unit 400, several possible combinations of arrangements of drawers therein is possible; for example, instead of the four box drawers illustrated, two box drawers can be provided over a file drawer, or two file drawers may be provided in place of the four box drawers. With respect to the storage unit 600, the door may be omitted therefrom and there also may be provided therein an adjustable shelf of the same construction and mounted in the same manner as the shelf 350 in the storage unit 200. A lesser number or a greater number of storage units might also be included in the storage assembly 100, the length of the top 101 and the length of the base 150 being adjusted accordingly.

Fundamentally, the storage unit 100 is formed of sheet metal with the exception of the several parts mentioned during the above description. Furthermore, the sheet metal forming the various parts is of relatively light gauge, as will be appreciated from the following examples of the gauge of sheet metal utilized to form the various parts of the storage assembly 100. For example, in a typical illustrative embodiment of the top 101, the top plate 102 is formed of 20 gauge steel, the edging 103 is formed of 18 gauge steel, the reinforcing sheet 110 is formed of 24 gauge steel and the mounting channels 120 are formed of 18 gauge steel. In an illustrative example of the construction of the base 150, the front frame member 151 is formed of 20 gauge steel and the rear frame member is formed of 20 gauge steel and the braces 165 are formed of 18 gauge steel. In illustrative examples of the storage units 200, 400 and 600, the bodies 201, 401 and 601 thereof are formed of 20 gauge steel, the channels forming the front frames 210, 410 and 610 are formed of 14 gauge steel, the rear top supports 220, 420 and 620 are formed of 18 gauge steel; the doors 240, 260 and 280 have the front panels and the reinforcing sheets thereof formed of 22 gauge steel while the several pick-up arms are formed of 16 gauge steel; the shelf 350 is formed of 20 gauge steel while the brackets 360 therefor are formed of 14 gauge steel.

From the above description it will be seen that there has been provided an improved storage assembly which fulfills all of the objects and advantages set forth above. More specifically, there has been provided an improved storage assembly including an integral elongated top 101 having a pair of spaced apart mounting channels 120 disposed on the underside thereof and secured thereto, and a plurality of storage units 200, 400 and 600 arranged in side by side relationship beneath the top 101 and secured thereto by means of the mounting channels 120, thereby to provide a compact and strong construction with good interconnection between the parts. Furthermore, an integral base is provided joining the lower ends of the storage units in the storage assembly. A wide variety of storage units can be accommodated in the storage assembly such as cabinets, bookcases, pedestals with drawers therein, cabinets with doors or without doors, and the like. All of the storage units are connected to an improved top including a flat top plate 102 and a reinforcing sheet 110 with reinforcing ribs 112 therein attached to the underside of the top plate 102, a body of mastic 115 being disposed between the contacting surfaces of the top plate 102 and the reinforcing sheet 110 with welds made therethrough, thus to provide a strong connection between the parts and to provide good sound deadening properties therein. Furthermore, the interconnection is facilitated by an improved channel and mounting nut construction including the channels 120 and the special nuts 140.

An improved cabinet 200 having improved doors 240, 260 and 280 therein has been provided, each of the doors including an outer panel and a reinforcing sheet disposed on the rear thereof, the reinforcing sheet being corrugated and bonded to the outer panel both by an adhesive and welds extending through the adhesive to provide a rigid construction with good sound deadening properties. Not only are the improved doors lightweight yet rigid but are also provided with suitable pulls and pick-up arms and abutment surfaces and are mounted upon track structure so that one motion fully opens or closes all of the doors; for example, the user grasping the righthandmost door can move that door and all other doors to the fully opened or fully closed position with a single motion and conversely the user upon grasping the lefthandmost door can move that door and all the other doors to the fully opened or fully closed position with a single motion.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A door for closing the front opening in a cabinet comprising a substantially flat rectangular front panel, side flanges on the opposite ends of said front panel disposed substantially normal thereto and extending rearwardly therefrom, a reinforcing sheet disposed adjacent to the rear side of said front panel and extending between said side flanges and having a plurality of longitudinally spaced apart attachment portions secured to the rear side of said front panel and a plurality of reinforcement ribs disposed between adjacent pairs of said attachment portions and spaced from the rear side of said front panel, and an engagement surface carried by said door near an end thereof for engagement with an adjacent door, whereby movement in one direction of said door into telescoping relationship with the adjacent door to provide engagement of said engagement surface carried by said door with the adjacent door provides for simultaneous movement of the telescoped doors in the one direction in response to further movement of said door in the one direction.

2. The pair set forth in claim 1, wherein said front panel and said reinforcing sheet are formed of sheet metal, and said attachment portions are secured to the rear side of said front panel by welding.

3. The pair set forth in claim 1, and further comprising a body of mastic disposed between each of said attachment portions and the rear side of said front panel, said attachment portions being welded to the rear side of said front panel through said bodies of mastic.

4. The door set forth in claim 1, and further comprising a pair of end flanges on said reinforcing sheet disposed adjacent to said side flanges and secured thereto.

5. The door set forth in claim 1, and further comprising a bottom flange on the lower edge of said front panel extending rearwardly therefrom, and a pair of lubric glides mounted on said bottom flange for supporting said door upon an associated track.

6. The door set forth in claim 1, and further comprising a bottom flange on the lower edge of said front panel extending rearwardly therefrom, a pair of lubric glides mounted on said bottom flange for supporting said door upon an associated track, and a top flange on the upper edge of said front panel extending rearwardly therefrom.

7. The door set forth in claim 1, and further comprising a pull mounted on said front panel adjacent to one end thereof, and a resilient bumper mounter on said side flange disposed adjacent to said pull.

8. The door set forth in claim 1, wherein said engagement surface comprises a pick-up arm mounted on one of said side flanges and extending forwardly with respect to said front panel for engagement with the adjacent door.

9. The door set forth in claim 8, wherein said arm has a resilient bumper on the portion thereof disposed forwardly with respect to said front panel.

10. The door set forth in claim 1, wherein said engagement surface comprises a first pick-up arm mounted on one of said side flanges and extending forwardly beyond said front panel, and a second pickup arm spaced from said one side flange and extending rearwardly from said front panel and beyond said reinforcement ribs.

11. The door set forth in claim 1, wherein said engagement surface comprises a pick-up arm mounted on one of said side flanges and extending forwardly with respect to said front panel for engaging the associated door, and further comprising a pull mounted on said front panel spaced from the other of said side flanges, and a resilient bumper mounted on said other side flange.

12. A sliding door assembly for closing the front opening in a cabinet, said assembly comprising a track structure extending the width of the associated opening and providing an inner track and an outer track and a center track disposed therebetween, a first sliding door mounted in said inner track for sliding movement therealong, a second sliding door mounted in said center track for sliding movement therealong, a third sliding door mounted in said outer track for sliding movement therealong, a first pick-up arm mounted adjacent to one end of said first door and extending forwardly toward the rear side of said second door, a first abutment surface disposed adjacent to the end of said second door disposed adjacent to said first door and a second abutment surface disposed adjacent to the other end of said second door, said first pick-up arm being disposed between said first and second abutment surfaces for abutting engagement therewith upon relative sliding movement between said first and second doors, a second pick-up arm mounted adjacent to said other end of said second door and extended forwardly toward the rear of said third door, a third abutment surface disposed adjacent to the end of said third door disposed adjacent to said second door and a fourth abutment surface disposed adjacent to the other end of said third door, said second pick-up arm being disposed between said third and fourth abutment surfaces for abutting engagement therewith upon relative sliding movement between said second and third doors, whereby when said doors are in the fully extended and closing positions thereof said first pick-up arm is disposed adjacent to said first abutment surface and said second pick-up arm is disposed adjacent to said third abutment surface, and whereby movement of said first door into telescoping relationship with said second door moves said first pick-up arm into engagement with said second abutment surface to cause movement of said second door therewith thereafter and conversely upon reverse movement of said first door to cause said first pick-up arm to engage said first abutment surface to move said second door with said first door, and whereby movement of said third door into telescoping relationship with said second door moves said second pick-up arm into engagement with said fourth abutment surface to cause movement of said second door therewith thereafter and conversely upon reverse movement of said third door to cause said second pick-up arm to engage said third abutment surface to move said second door with said third door.

13. The sliding door assembly set forth in claim 12 wherein each of said pick-up arms carries a resilient bumper thereon on the portion thereof extending forwardly from the associated door.

14. The sliding door assembly set forth in claim 12, and further comprising a pair of glides mounted on the bottom of each of said doors for supporting the associated door upon the associated bracket, and a resilient bumper disposed on the outer end of said first door and a resilient bumper disposed on the outer end of said third door.

15. The sliding door assembly set forth in claim 12, and further comprising a first pull mounted on the front of said first door adjacent to the other end thereof, a second pull mounted on the front of said third door adjacent to the other end thereof, and a third pick-up arm mounted on the rear of said second door and spaced from said other end and extending rearwardly therefrom and in general horizontal alignment with said first pick-up arm to provide said second abutment surface, thereby to prevent said second door from contacting said first pull.

References Cited

UNITED STATES PATENTS

| | | | |
|---|---|---|---|
| 1,315,537 | 9/1919 | Barrows | 49—501 |
| 2,707,535 | 5/1955 | Weimer | 49—501 |
| 2,818,946 | 1/1958 | Noel et al. | 49—501 |
| 3,172,509 | 3/1965 | Dugger | 49—501 |
| 3,238,003 | 3/1966 | Stark | 312—304 |
| 3,307,895 | 3/1967 | Renner et al. | 312—304 |

JAMES T. McCALL, Primary Examiner

U.S. Cl. X.R.

49—501; 312—304

UNITED STATES PATENT OFFICE
CERTIFICATE OF CORRECTION

Patent No. 3,519,321　　　　　　　　　　　　　　　July 7, 1970

Kenneth D. Schreyer

It is certified that error appears in the above identified patent and that said Letters Patent are hereby corrected as shown below:

Column 3, line 38, cancel "therefrom", second occurrence. Column 4, line 40, "he" should read -- the --; line 42, "usually" should read -- unusually --. Column 5, line 25, "one" should read -- on --; line 47, "flanges" should read -- flange --; line 69, "central" should read -- center --. Column 10, line 31, "sheft" should read -- shelf --. Column 12, line 11, "mounter" should read -- mounted --. Column 13, line 5, "abumtent" should read -- abutment --.

Signed and sealed this 12th day of January 1971.

(SEAL)
Attest:

Edward M. Fletcher, Jr.
Attesting Officer

WILLIAM E. SCHUYLER, JR.
Commissioner of Patents